United States Patent Office 3,250,971
Patented May 10, 1966

3,250,971
DIRECT-CURRENT MOTOR WITH COMMUTATOR
Julius Brunner, Nurnberg, and Peter Moisel, Erlangen, Germany, assignors to Siemens-Schuckertwerke Aktiengesellschaft, Berlin-Siemensstadt, Germany, a corporation of Germany
Filed Jan. 20, 1964, Ser. No. 338,790
Claims priority, application Germany, Jan. 24, 1963, S 83,399
10 Claims. (Cl. 318—138)

Our invention relates to direct-current motors having a permanent-magnet rotor and an electronically operating commutator. In a preferred, though not exclusive aspect, our invention concerns direct-current commutator motors of the midget type operating at high speeds of rotation.

In many cases, the commutators of direct-current motors cause considerable difficulty, particularly at high speeds of 30,000 r.p.m. or more.

In some direct-current motors, commutating devices of the electronic type, have eliminated the mechanical commutators generally employed. In such motors, as a rule, the rotor is equipped with a permanent magnet, and the armature winding is mounted in the stator. The simplest construction of this type comprises two stator windings 90° displaced from each other. Commutation is effected by means of electronic switching units which generally are controlled in dependence upon the rotation of the rotor. A motor-commutator system of this type utilizes Hall generators that are stationarily mounted and are subjected to a periodic magnetic field produced and varied by permanent magnets which rotate together with the rotor, the generated Hall voltage serving as a control signal for the electronic switching devices proper. In such systems simply reversing the control current through the Hall generators reverses the running direction of the motor and produces a rapid braking action.

It is an object of our invention to provide a direct-current motor of the above-mentioned type which is easily constructed in a small size, such as that of "midget type" motors; and it is also an object of the invention to provide an electronically commutated direct-current motor that permits controlling and regulating the speed of rotation, particularly for a desired constant speed, while requiring relatively simple circuit components of the static solid-state type.

Still another object of our invention, subsidiary to those mentioned, is to devise an accurately regulated, small motor capable of metting such exacting constancy requirements as needed, for example, when using the motor as drives in dental drills and similar equipment.

To achieve these objects and in accordance with a feature of our invention, each of the above-mentioned two stator windings of a direct-current motor having its rotor polarized by means of a permanent magnet, is connected in the diagonal of a bridge network formed of a direct-current source with a mid-tap and two switching transistors or equivalent semiconductor switching devices; furthermore, the motor is provided with means that derive from the rotor rotation the respective control pulses for firing the switching transistors in a sequence and at the frequency required for producing in the two stator windings respective alternating pulse currents of adjustable pulse duration and 90° phase displacement relative to each other.

According to another feature of our invention, the pulse length, or the corresponding duration of the current flow in the stator windings, is controlled within a 90° range or a 180° range by means of four RC members connected in the ignition control circuits for the respective four switching transistors. For adjusting or varying the rotating speed of the motor, the resistances of the respective four RC members are varied accordingly and this can be done conjointly for the four resistors, such as by ganging them together.

In a system of this type, the control pulses are primarily produced by permanent magnets which are coupled with the rotor to rotate together therewith and which act upon the Hall generators.

For further explaining the invention, reference will be made to an embodiment of a direct-current commutator motor according to the invention illustrated by way of example on the accompanying drawings, although it will be obvious to those skilled in the art that our invention can be given embodiments different from those particularly illustrated and described herein, without departing from the essential features of our invention and within the scope of the claims annexed to the end of this specification. In the drawings:

Figure 1:
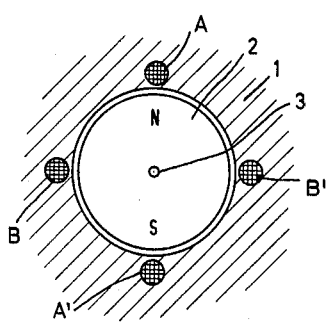
FIG. 1 shows schematically and in principle the stator and rotor.

As shown in FIG. 1, the motor comprises a stator structure 1 of magnetizable material such as a stack of laminations, which is provided with two stator windings A–A' and B–B' which are 90° displaced from each other. The rotor 2 of the motor, mounted on the motor shaft 3, consists of a two-pole permanent magnet which is diagonally polarized, the magnet poles being denoted by N and S.

Figure 2:
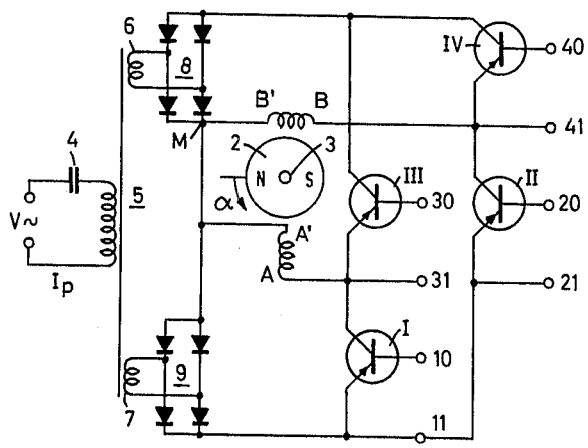
FIG. 2 shows an embodiment of a circuit diagram comprising the same motor, except for the Hall generators and appertaining amplifiers of which an example is separately illustrated diagrammatically in FIG. 4.
Figure 4:
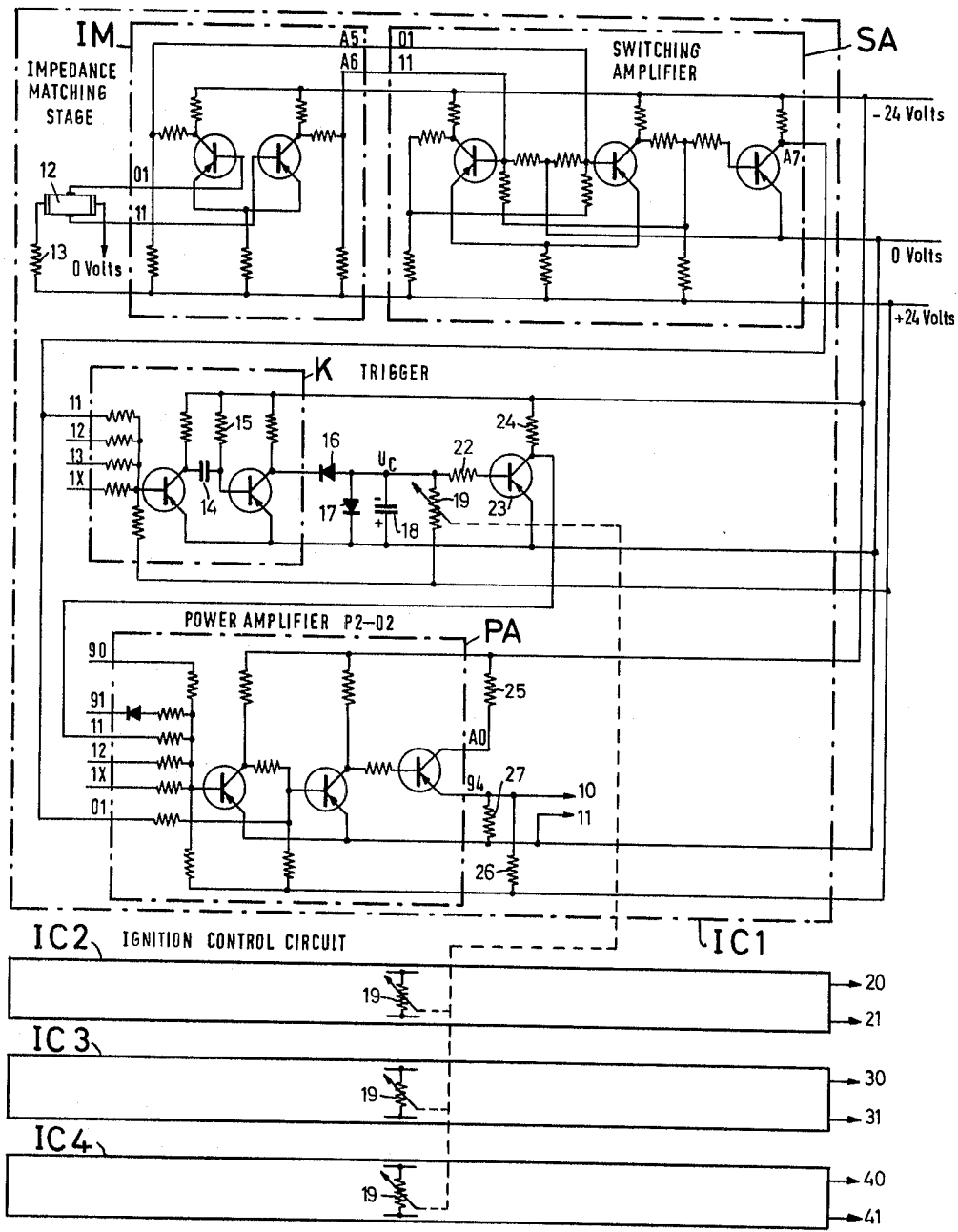
FIG. 4 is a block diagram of the ignition control circuits for the circuit of FIG. 2, one of the control circuits being shown in detail.

In the circuit diagram of FIG. 2, only the rotor 2 and the stator windings A–A' and B–B' are shown in conjunction with the circuit components connected to the winding for energizing them and for commutating the energization in synchronism with the rotation of the rotor. An alternating-voltage source V is connected through a limiting impedance, here constituted by a capacitor 4, to a transformer 5 which has two secondary windings 6 and 7 of the same number of turns. The secondary windings energize respective rectifier bridges 8 and 9 which jointly form a direct-current source with a mid-tap denoted by M. Due to the limited impedance 4, the output current from the direct-current source 8, 9 cannot exceed a given value so that the transformer windings and the transistors connected thereto are protected from overloading. The stator windings A–A' and B–B' are connected in the respective diagonals of two bridge networks each being formed of a common direct-current source on the one hand and of respective two switching transistors I, III and II, IV on the other hand. A separate ignition control circuit, such as those shown in FIG. 4, is provided for each of the four transistors. The ignition control circuits are connected to the terminals 10–11, 20–21, 30–31 and 40–41 of the individual transistors respectively.

Figure 3:
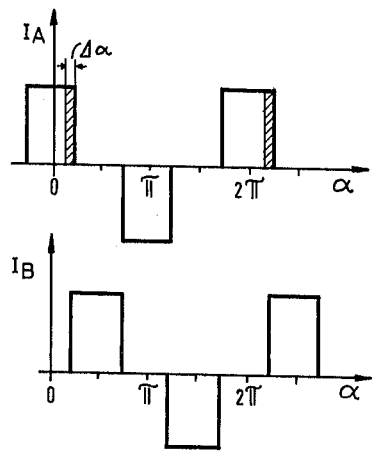
FIG. 3 is an explanatory graph relating to the performance of the motor-commutator 6.

In a system according to FIG. 2, alternating-current pulses can be passed in both directions through the stator windings under control by the switching transistors. The transistors, in turn, are controlled so as to pass current through the stator windings alternately in the manner schematically represented in FIG. 3 where the abscissa denotes the rotational angle $\alpha$ of the rotor and the ordinates of the two correlated graphs show the current $I_A$ in winding A–A' and the current $I_B$ in winding B–B' respectively. The illustrated 90° ranges of the current-flow angles cannot be exceeded. However, for controlling the rotating speed, it is possible to permit a current flow only during small angular portions within the available ranges. For example, the current can be controlled to flow only during the portion denoted in FIG. 3 by $\Delta\alpha$. Consequently, the current-flow duration in each individual winding can be adjusted and varied between zero and one-half of the rotation period of the motor. The current-flow periods depend upon the load of the motor, so that it is possible to maintain the rotary speed substantially constant.

The ignition control circuits IC1, IC2, IC3, and IC4, for the switching transistors, are shown in FIG. 4; the control circuit IC1 for transistor I being shown in detail. In IC1 the ignition pulse is primarily generated by means of a Hall generator 12. Such generators may consist of an indium antimonide wafer having rectangular shape, two current-terminals extending along the respective narrow sides of the rectangle, and two probe electrodes, the "Hall electrodes," being located on the respective long sides midway between the terminals. The current terminals of the Hall generator 12 are connected through a resistor 13 to a direct voltage of 24 volts. The generated Hall voltage, appearing between the Hall electrodes, passes through an impedance matching stage IM to a switching amplifier stage SA. The stages IM and SA, as well as the subsequent stages K and P2–O2 are available in the trade as circuit components under the trade name Simatic of the assignee of this invention.

The output of the amplifier stage SA is connected to the input circuit of the power amplifier stage P2–O2. The same output is also connected to a trigger stage K which includes a capacitor 14 and a resistor 15 for imparting the desired timing characteristic to stage K. Connected to the output of the trigger stage K through diodes 16 and 17 is a capacitor 18 which, together with a resistor 19, forms an RC member. The RC-member controls through a resistor 19 the base voltage and thereby the conductance of a pre-control transistor 23 which is connected with a collector resistor 24 from which a lead passes to the second input lead of the power amplifier stage P2–O2. Resistors 25, 26 and 27 connected in the output circuit of the power-amplifier stage serve for adjusting the base current and for blocking the power transistor I (FIG. 2), it being understood that the leads denoted by 10 and 11 in FIG. 4 are connected to the respective terminals 10 and 11 in FIG. 2.

In an embodiment built and operated in accordance with FIG. 4, the individual components were rated as follows: member 14=20 nF, 15=50 $k\Omega$, 18=10 $\mu f.$, 22=10 $k\Omega$, 23=OC 77, 24=30 $k\Omega$, 25=80$\Omega$, 26=4 $k\Omega$, 27=100$\Omega$.

Figure 5:
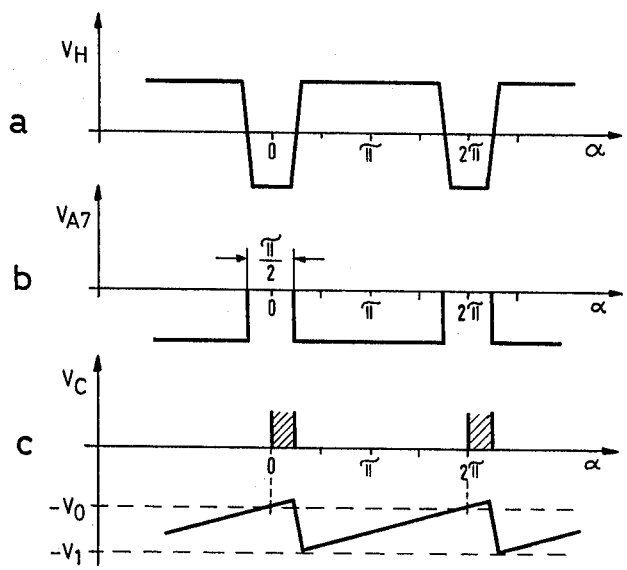
FIG. 5 is an explanatory graph relating to the operation of the ignition control circuit according to FIG. 4.

FIG. 5 shows diagrams of the voltages illustrating the performance of the system. Graph 5a indicates the voltage $V_H$ furnished from Hall generator 12 in dependence upon the rotational angle $\alpha$ of the rotor. Graph $b$ in FIG. 5 shows the output voltage at $V_{A7}$ of the stage SA which is equal to zero in the angular range of $$7\frac{\pi}{4} \text{ to } 9\frac{\pi}{4}$$

and which has a finite value in the other angular ranges. Graph $c$ in FIG. 5 shows the voltage $C_C$ of capacitor 18.

At the angle $\alpha=\pi/4$ the capacitor 18 is charged from the trigger stage K for a short interval of time $\tau$ by a current of 4 mA up to the voltage $-v_1$. Then the capacitor voltage decreases linearly with time, because a discharge current of $24V/R$ flows into the capacitor through the resistor 19 having the resistance value R. The capacitor voltage thus passes at a given moment below the critical threshold value $-V_0$ of the switching stage formed of the transistor 23 and the trigger stage P2–O2. From this moment on, the switching transistor I is turned on. It remains conductive until the voltage $V_{A7}$ becomes different from zero and thus blocks the power stage P2–O2.

The speed of rotation is determined by the rate of discharge $$\frac{dV_C}{dt} = \frac{24}{RC}$$

wherein C denotes the capacitance value of the capacitor 18. Consequently the speed can be chosen, controlled or regulated by varying the resistance of resistor 19. The resistor 19 in ignition control circuit IC1 is ganged with the resistors 19 in circuits IC2, IC3 and IC4.

The speed regulation involves the following phenomena:

When the speed is too high, then the voltage $V_C$ across capacitor 18 becomes more and more negative relative to terminal 11 because each pulse furnished from the trigger stage K charges the capacitor 18 an amount $$\frac{1}{C} \cdot \tau \cdot 4 \text{ mA}.$$

As a result, the angle $\Delta\alpha$ during which the switching transistor is turned on, becomes smaller and may even become zero, so that the rotating speed decreases. However, when the speed is lower than the desired value, the angle $\Delta\alpha$ becomes larger and may reach the value $\pi/2$.

In the stationary condition $$\frac{1}{C} \cdot \tau \cdot 4 \text{ mA}. = \frac{24V}{RC} \cdot (T-\tau)$$

wherein T is the period of time required by the rotor for one full rotation. It follows that $$T = \tau \cdot \left(1 + \frac{R}{6 k\Omega}\right)$$

The rotation period of the rotor and consequently its speed are thus a function of the resistance value R to which the resistor 19 is adjusted. The time $\tau$ can be chosen, for example, to amount to 0.6 m.sec.

Since each switching transistor I, II, III and IV is provided with its own ignition control circuit, it is advisable to keep the discharge rates of the respective capacitors 18 as equal as possible to one another in order to achieve constant rotating speed. This is done by ganging the resistors 19 in circuits IC1, IC2, IC3 and IC4. If the discharge rates of the capacitors are different, the motor first runs at the speed corresponding to the largest discharge rate. When the corresponding angular range $\Delta\alpha$ has reached the value $\pi/2$ the speed drops down to the value corresponding to the next lower discharge rate. The accuracy of motor-speed regulation, therefore, depends upon the magnitude of any differences in the capacitor discharging rates.

Figure 6:
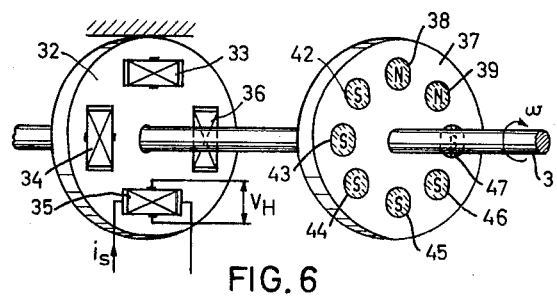
FIG. 6 shows in schematic perspective the signal-issuing Hall-generator portion of the motor-commutator system shown in FIGS. 1, 2 and 4.

In the embodiments of the Hall-voltage signal portion, shown in FIG. 6, a stationary disc 32 of ferrite carries four Hall generators 33, 34, 35 and 36, each having control-current terminals and Hall electrodes, as described in the foregoing. Mounted on the motor shaft 3 is a disc 37 which is provided with magnetic North poles and South poles arranged in an angular ratio of 1:3. For example, a disc of brass may be provided with inserted permanent magnets of which two (38, 39) are magnetized in one direction and six (42, 43, 44, 45, 46, 47) are magnetized in the other direction. In operation, the disc 37 rotates in coaxial relation to the fixed disc 32 and at a slight axial distance therefrom. The control current of the Hall generator flows in a direction perpendicular to the line defined by the motor axis and the mid-point of each Hall generator. In this case, no disturbing torque can be produced by coaction of the magnetic field of the permanent magnets with the control currents, any such coaction resulting only in the formation of radial forces which are not detrimental.

Figure 7:
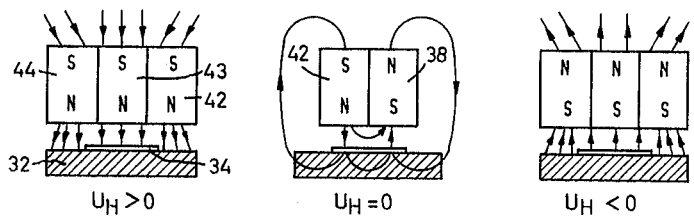
FIG. 7 is explanatory and relates to different conditions of the magnetic fields and voltages occurring at each Hall generator.
Figure 8:
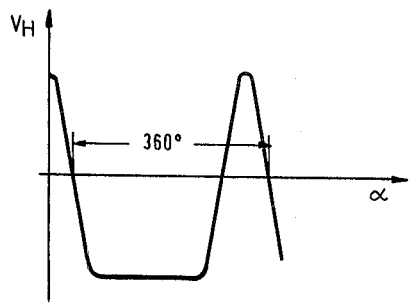
FIG. 8 is another explanatory graph, also relating to the voltage generated by one of the Hall generators.

The magnetic fields and voltages at the Hall generators vary as shown by FIGS. 7 and 8. At the localities of alternating magnetizing direction, the Hall voltage $V_H$ changes its sign (polarity). Therefore, the Hall voltage changes in dependence upon the rotational angle of the rotor as represented by the voltage curve in FIG. 8, corresponding fundamentally to FIG. 5a. The impedance matching and amplifier stages make the voltage available at the desired polarity and with steep pulse flanks desirable for the control of the switching transistors I to IV.

Figures 9, 10:
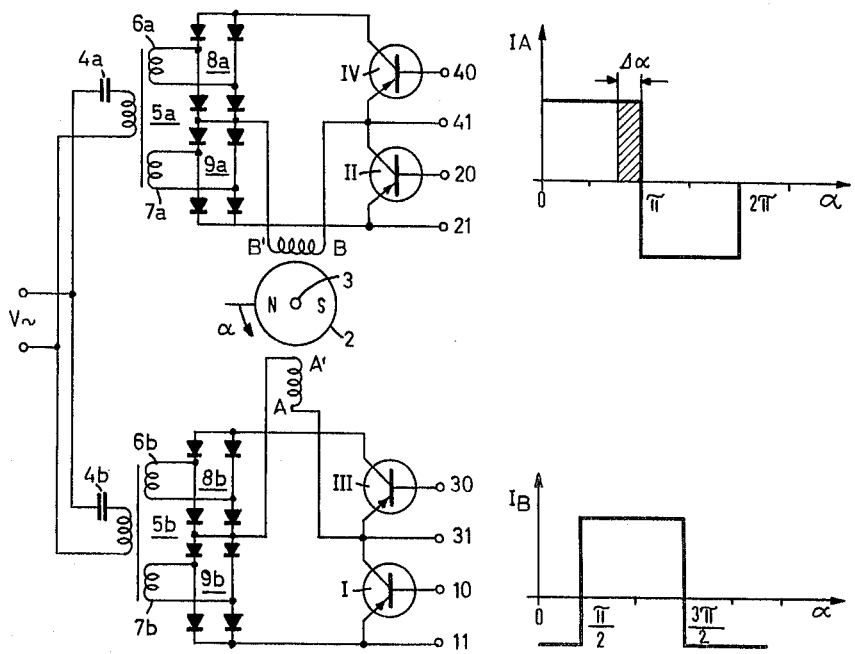
FIG. 9 is a circuit diagram of a somewhat modified motor-commutator system according to the invention.
FIG. 10 is an explanatory graph relating to the system of FIG. 9.

FIG. 9 shows a modification of the system of FIG. 2, the same reference characters being used in both illustrations for respectively similar components. According to FIG. 9, two separate mid-tapped direct-current sources, 8a, 9a and 8b, 9b, are each supplemented by two switching transistors II, IV and I, III to form a bridge network in whose diagonal one of the stator windings is connected. The control is effected in accordance with FIG. 10 such that the currents in each of the two stator windings change their polarity after one-half rotor rotation (180°-range). The two alternating pulse currents are 90° displaced from each other, as is apparent from FIG. 10, and in accordance with the performance of the system shown in FIG. 2. The system of FIG. 9 also affords adjusting the pulse length within the 180°-range, for example to the partial range α indicated in FIG. 10. When the pulse length is adjusted to the available maximum, the windings are continuously traversed by current.

For use of a system according to FIG. 9, the device shown in FIG. 6 is modified such that the North poles and South poles in disc 37 are not arranged in the angular ratio 1:3, but rather in the ratio 1:1. That is, the disc contains equal numbers of North and South poles.

The embodiment described with reference to FIGS. 9 and 10 require somewhat more equipment than that according to FIG. 2, but permits reversing the running direction of the motor by reversing the control current of the Hall generators. It further permits rapid braking of the motor.

The operational behavior of a motor according to the invention corresponds substantially to that of a separately excited direct-current motor with constant field excitation whose speed is regulated to a constant value with the aid of controlling the armature current. Various other modifications can be applied to the illustrated circuits, particularly to the ignition control circuit exemplified by FIG. 4, although the one shown in FIG. 4 has been found to be practical.

We claim:

1. A direct-current motor with commutator, comprising a permanent-magnet rotor, two stator windings displaced 90° from each other, two bridge networks having each a diagonal in which one of said respective stator windings is connected, each network having a mid-tapped direct voltage source whose two half-portions form two bridge branches adjacent to said diagonal, the remaining two branches of each network being formed substantially of respective semiconductor switching devices, transducer means for translating the rotation of said rotor into two alternating pulse currents of 90° phase displacement from each other, each of said semiconductor devices having an ignition control circuit connected to said transducer means for applying said pulse currents to said devices.

2. A direct-current motor with commutator, comprising a permanent-magnet rotor, two stator windings displaced 90° from each other, two bridge networks having each a diagonal in which one of said respective stator windings is connected, each network having a mid-tapped direct voltage source whose two half-portions form two bridge branches adjacent to said diagonal, the remaining two branches of each network being formed substantially of respective switching transistors, transducer means for translating the rotation of said motor into two alternating pulse currents of 90° phase displacement from each other, each of said transistors having an ignition control circuit, and circuit means connecting said transducer means to said control circuit and comprising pulse-length adjusting means for controlling the motor speed.

3. A direct-current motor with commutator, comprising a permanent-magnet rotor, two stator windings displaced 90° from each other, a direct-voltage source having a mid-tap, two pairs of switching transistors connected across said source, each pair having its two transistors serially poled and having a circuit point intermediate said two transistors, each of said two stator windings being connected between said mid-tap and one of said respective intermediate points; transducer means for translating the rotation of said rotor into two alternating pulse currents of 90° phase displacement from each other, each of said switching transistors having an ignition control circuit connected to said transducer means for applying said pulse currents to said transistors, and pulse-length adjusting means interposed between said transducer and said control circuit for controlling the motor speed.

4. In a direct-current motor with commutator according to claim 2, said circuit means comprising four coordinately interrelated stages each being interposed between said transducer means and one of said four transistor ignition control circuits, and said pulse-duration adjusting means comprising four RC-members in said respective stages.

5. In a direct-current motor with commutator according to claim 4, said four RC-members having respective adjustable resistors ganged with one another for joint speed-controlling adjustment.

6. A direct-current midget motor with commutator, comprising a permanent-magnet rotor, two stator windings displaced 90° from each other, two bridge networks having each a diagonal in which one of said respective stator windings is connected, each network having a mid-tapped direct voltage source whose two half-portions form two bridge branches adjacent to said diagonal, the remaining two branches of each network being formed substantially of respective semiconductor devices, a transducer having two members of which one is connected with said rotor to rotate together therewith relative to said other transducer member, one of said two transducer members having permanent-magnet means and the other member having Hall generators for providing two alternating voltages of 90° phase displacement from each other, pulse generator means connected to said Hall generators to provide respective 90° phase displaced pulse currents, each of said semiconductor devices having an ignition control circuit connected to said pulse generator means for applying said pulse currents to said semiconductor devices.

7. In a direct-current motor with commutator according to claim 6, said other transducer member comprising a stationary disc of ferrite, four of said Hall generators being mounted on said plate and 90° displaced from one another, said rotatable transducer member consisting essentially of a plate rotatable in coaxial relation to said ferrite plate and provided with magnetic North and South poles to sequentially rotate over said four Hall generators.

8. In a direct-current motor with commutator according to claim 2, said transducer comprising two coaxial disc members, one of said disc members being connected with said rotor to rotate together therewith and having permanent magnet means polarized diagonally, said other disc member being stationary and having four Hall generators mounted thereon, said Hall generators being 90° displaced from one another to produce respective alternating voltages when said magnet means pass sequentially by said generators, pulse generator means connected to said Hall generators to provide respective 90° phase displaced pulse currents, each of said transistors having an ignition control circuit connected to said pulse generator means for applying said pulse currents to said semiconductor devices.

9. In a direct-current motor with commutator according to claim 6, said two bridge networks having said mid-tapped direct-voltage source in common, and said permanent-magnet means of said one transducer member having one of its magnetic North and South polarities extend over an arcuate range about three times larger than the arcuate range of the other polarity.

10. In a direct-current motor with commutator according to claim 6, said direct voltage sources of said two bridge networks being separate and insulated from each other, and said permanent-magnet means of said one transducer member having equal numbers of diagonally opposite North and South poles.

References Cited by the Examiner
UNITED STATES PATENTS 3,200,316   8/1965   Engel _____ 318—138

ORIS L. RADER, *Primary Examiner.*

G. SIMMONS, *Assistant Examiner.*